United States Patent
Filippi et al.

(10) Patent No.: US 9,403,146 B2
(45) Date of Patent: Aug. 2, 2016

(54) METHOD OF REVAMPING OF AN AMMONIA PLANT FED WITH NATURAL GAS

(71) Applicant: Casale SA, Lugano (CH)

(72) Inventors: Ermanno Filippi, Castagnola (CH); Raffaele Ostuni, Milan (IT)

(73) Assignee: Casale SA (CH)

( * ) Notice: Subject to any disclaimer, the term of this patent is extended or adjusted under 35 U.S.C. 154(b) by 0 days.

(21) Appl. No.: 14/399,424

(22) PCT Filed: Feb. 8, 2013

(86) PCT No.: PCT/EP2013/052532
§ 371 (c)(1),
(2) Date: Nov. 6, 2014

(87) PCT Pub. No.: WO2013/167287
PCT Pub. Date: Nov. 14, 2013

(65) Prior Publication Data
US 2015/0151272 A1    Jun. 4, 2015

(30) Foreign Application Priority Data
May 7, 2012    (EP) .................................... 12166958

(51) Int. Cl.
| C01C 1/04 | (2006.01) |
| C01B 3/38 | (2006.01) |
| B01J 19/24 | (2006.01) |
| C01B 3/02 | (2006.01) |

(52) U.S. Cl.
CPC ............... B01J 19/245 (2013.01); C01B 3/025 (2013.01); C01B 3/38 (2013.01); C01C 1/0417 (2013.01); B01J 2219/24 (2013.01); C01B 2203/0233 (2013.01); C01B 2203/068 (2013.01); Y10T 29/49716 (2015.01)

(58) Field of Classification Search
CPC .............. C01B 2203/147; C01B 3/025; C01B 2203/0475; C01B 2203/025; C01B 3/48; C01B 2203/0244; C01B 3/382; C01B 2203/068; C01B 2203/142; C01B 2203/1235; C01B 2203/042; C01B 2203/0435; C01B 2203/0415; C01B 2203/04; C01C 1/0405
See application file for complete search history.

(56) References Cited

U.S. PATENT DOCUMENTS

| 4,545,976 A * | 10/1985 | Osman ........................... 423/650 |
| 2010/0303703 A1* | 12/2010 | Filippi et al. .................. 423/359 |
| 2011/0042620 A1 | 2/2011 | Singh et al. |

FOREIGN PATENT DOCUMENTS

| EP | 0770578 A2 | 5/1997 |
| EP | 2065337 A1 | 6/2009 |
| WO | 98/45211 A1 | 10/1998 |

OTHER PUBLICATIONS

International Search Report issued in connect on with PCT/EP2013/052532.
International Preliminary Report on Patentability issued in connection with PCT/EP2013/052532.

* cited by examiner

Primary Examiner — Stanley Silverman
Assistant Examiner — Syed Iqbal
(74) Attorney, Agent, or Firm — Akerman LLP

(57) ABSTRACT

A method of revamping of an ammonia plant fed with natural gas comprising a primary reformer (11) and a secondary reformer (12), the method comprising at least the following interventions: reducing the outlet temperature of the gas (17) flowing out from said primary reformer; adding a feeding line of substantially pure oxygen (30) directed to said secondary reformer (12) to at least partially replace the comburent process air; adding a nitrogen injection line (31) in an amount necessary to obtain a make-up gas suitable for ammonia synthesis.

9 Claims, 2 Drawing Sheets

METHOD OF REVAMPING OF AN AMMONIA PLANT FED WITH NATURAL GAS

This application is a national phase of PCT/EP2013/052532, filed Feb. 8, 2013, and claims priority to EP 12166958.4, filed May 7, 2012, the entire contents of both of which are hereby incorporated by reference.

FIELD OF APPLICATION

The invention concerns a method of revamping of ammonia plants fed with natural gas. The invention in particular describes a method to increase capacity of an ammonia plant when availability of natural gas is limited.

PRIOR ART

Ammonia synthesis plants fed with natural gas comprise a high-pressure synthesis section (also called synthesis loop) and a so-called front-end section, which substantially has the task of converting natural gas into a gas suitable for feeding the synthesis loop, i.e. containing hydrogen and nitrogen in the desired stoichiometric ratio, and free from impurities.

The front-end section essentially comprises a natural gas reforming section and treatment sections including: conversion of carbon monoxide into carbon dioxide (shift), removal of carbon dioxide, methanation. The reforming section generally comprises a primary reformer fed with natural gas and steam, and a secondary reformer that receives the partially reformed gas from the primary reformer and a flow of a comburent, for example air or oxygen.

In the primary reformer, the methane reacts catalytically with the steam forming carbon monoxide (CO) and hydrogen ($H_2$). The reaction is endothermal and is supported by a suitable heat source. Typically, the primary reformer comprises a radiant section in which a bundle of tubes filled with a suitable catalyst is installed. The radiant section comprises a series of burners, fed with a part of the available natural gas. The combustion heats the tubes and furnishes the reforming heat. Downstream of said radiant section, the primary reformer comprises a section known as convective section, substantially dedicated to the recovery of heat from the fumes.

The process gas leaving the primary reformer has a temperature typically of about 800° C. A partial combustion of the gas coming from the primary reformer takes place in the secondary reformer, followed by a further step of catalytic conversion.

Hence the supply of natural gas is split substantially into two quotes: a first process quote and a second fuel quote. The process quote is used as reactant for the reforming process, i.e. is fed to the tubes of the primary reformer and then to the secondary reformer; the fuel quote typically comprises a part that generates directly the reforming heat, feeding the burners of the radiant section of the primary reformer, and a part that is burnt to generate mechanical power which is necessary for the operation of the plant.

Said mechanical power, in particular, is necessary mainly for driving the air compressor that feeds the secondary reformer and the gas compressor that feeds the high-pressure synthesis loop. For example, said compressors are normally driven by a steam turbine; the steam comes partly from a boiler fuelled with a quote of the natural gas, and partly by process thermal recovery, in particular from cooling of the fumes in the convective part of the reformer.

The amount of process gas, for a given production of ammonia, is fixed by the stoichiometry of the reaction. The fuel quote is not negligible and represents about 20-30% of the total consumption of natural gas, according to the efficiency of the plant.

It is thus possible to define a specific consumption of the plant, calculated in Gcal of lower heating value (LHV) of the methane per ton of ammonia produced. Said consumption comprises the quote of natural gas actually converted in the reforming section, and the quote burnt as fuel to keep the plant running. A maximum capacity of the plant can also be defined, and is usually expressed in terms of metric tonnes of ammonia that can be produced per day (metric tons per day, MTD).

In existing ammonia plants, of the type considered here, the availability of natural gas up to now has been largely sufficient. Many big ammonia plants are for example installed in geographical areas characterised by the availability of large quantities of natural gas. Therefore, efforts have been focused mainly on obtaining the highest possible capacity, which is limited by factors like the capacity of the various plant sections, more than available quantity of natural gas.

In more recent times, however, limitations of quantity of natural gas available for these ammonia plants have emerged. In some cases, a limitation derives from an objective gas shortage, due to the reduction of the production of the gas fields; in other cases, the limitation derives from commercial and/or economic reasons like the running out of the contractual share available to the plant and/or a different scenario involving the prices and the demand for natural gas. In such cases, one must tackle the problem of how to maintain or increase ammonia production facing a limited supply of natural gas. In particular, there begins to be a need to increase the capacity of the plant, i.e. the production, without any longer the possibility of increasing the total consumption of natural gas.

There are various known methods of revamping existing ammonia plants, but they have been devised mainly with the purpose of increasing the maximum capacity. Essentially, such methods suggest revamping the machines (turbines and compressors) to increase efficiency; adding a reactor (booster reactor) in parallel to the existing ammonia reactor; increasing the number of heat exchangers to improve thermodynamic efficiency. However, it has been seen that they improve specific consumption to a relatively small extent, typically by 3-4%. Therefore, in a situation where the supply of natural gas is limited and can no longer be increased, these methods are unsatisfactory.

This is due to the fact that most of the fuel gas is used to heat the primary reformer and to produce the mechanical power for the compressors, and these two sources of consumption are substantially proportional to production. Consequently, the increase in production requires, to a corresponding extent, an increase in the fuel quote of the gas. Such known processes are therefore effective when the gas is abundant, but they are not suitable for solving the above problem, facing a shortage of natural gas.

In attempts to solve said problem, it has been proposed to replace the steam turbines that operate as plant driver machines with electric motors. This solution is only applicable in certain cases, when electric energy is available in sufficient quantities and is produced with a source other than natural gas. It has also been noted that it does not lead to satisfactory results.

Indeed, part of the steam originates from the heat recovered from the fumes of the primary reformer and other parts of the process, e.g. cooling the gas effluent of the secondary reformer, as mentioned above, and at least a certain minimum amount of steam must be superheated in the convective part of the primary reformer, to avoid an excessive temperature of the fumes. Therefore, a dramatic reduction of the demand for steam (by replacing the steam turbines with electric motors) would affect the thermal balance of the plant, introducing a lack of steam as cooling means. In order to solve this drawback, expensive modifications to the primary reformer are necessary, like: addition of an air preheater, or extension of an existing preheater; increase in the preheating temperature of the air, revision of the distribution system of the preheated air to the burners.

For all of these reasons, the prior art does not yet offer a satisfactory and cost effective solution to the aforementioned problem.

SUMMARY OF THE INVENTION

The invention proposes to solve the aforementioned problem, i.e. how to revamp an ammonia plant, of the type considered here, to tackle a limitation of the availability of natural gas.

The invention proposes a method for increasing the capacity of an ammonia plant fed with natural gas, substantially structured as follows. The plant comprises a front-end section for converting natural gas into a make-up gas for ammonia synthesis, and said front-end section comprises a primary reformer and a secondary reformer; the overall supply of natural gas fed to the plant comprises a process quote used for the catalytic conversion of methane into hydrogen and fed to said primary reformer, and a fuel quote; said primary reformer comprises a radiant section and a convective section, said radiant section performs a catalytic conversion of said process gas and transfers to said process gas a thermal power also known as duty of the reformer; the secondary reformer is fed with comburent process air and with partially reformed process gas coming from the primary reformer.

The proposed method is characterised in that it comprises at least the following interventions:
decreasing said duty of the primary reformer relative to the amount of ammonia produced, and consequently decreasing the outlet temperature of the partially reformed process gas effluent from said primary reformer;
adding a feeding line of substantially pure oxygen directed to said secondary reformer to at least partially replace said comburent process air;
adding a nitrogen injection line in a quantity necessary to obtain said make-up gas suitable for ammonia synthesis;
reducing said fuel quote and consequently increasing said process quote, for a given supply of natural gas.

The temperature of the (partially reformed) process gas flowing out from the primary reformer is reduced preferably by at least 30° C. and more preferably by at least 50° C. In the preferred embodiments of the invention said temperature decrease is within a range from about 30° C. to about 150° C. For example, the temperature of the outflow of the primary reformer falls from about 800° C. to a value comprised between 600 and 750° C. and preferably between 650 and 750° C.

Said feed of substantially pure oxygen can be provided in addition to process air, or as a replacement for process air. In other words, in a first embodiment the original flow of process air is reduced, feeding part of the oxygen necessary to the secondary reformer with the new stream of pure oxygen; in a second embodiment the addition of process air is discontinued and all of the oxygen is supplied through said new stream.

Said stream of pure oxygen can be produced with an air separation process at a sufficient pressure for injection into the secondary reformer. The invention thus has the advantage of decreasing or completely avoiding the consumption of the air compressor originally provided to feed air to the secondary reformer.

The nitrogen is preferably injected downstream of the existing methanator. Such a provision is advantageous to avoid an increase in flow rate in the shift and $CO_2$ removal sections upstream. The nitrogen can be injected for example at the intake of an existing compressor of the synthesis gas, or to an intermediate stage of said compressor.

One of the aspects of the invention consists of reducing the duty of the primary reformer. Said duty represents the heat transferred to the process gas during the step of primary reforming, in the radiant section of the primary reformer. Said duty is generally indicated in Gcal/h or MW of thermal power.

The term specific duty shall be intended as the duty relative to the ammonia produced, for example expressed in MWh per ton of ammonia.

The reduction in duty of the primary reformer, accompanied by the feed of oxygen to the secondary reformer, basically has the effect of shifting the reforming reaction from the primary reformer to the secondary reformer. This provision is contrary to the teaching of the prior art, which tends to exploit the primary reformer to the greatest possible extent, since the primary reformer is more favourable with respect to the secondary in terms of stoichiometry. However, the applicant has found that by shifting the reforming reaction towards the secondary, a small loss in efficiency (production of ammonia over consumption of feed gas) is overcompensated by the decrease of the fuel quote of natural gas. In other words, for a given supply of natural gas, the invention allows that a larger quote of gas is sent to the reforming process, so as to achieve the desired increase of capacity despite the slightly lower efficiency of conversion.

Indeed, the invention drastically reduces the fuel quote of the gas for the same production, by the reduction or avoidance of the steam consumption in the turbine of the air compressor, and by the reduction of the steam consumption in the turbine of the syngas compressor.

More specifically, a series of advantages derive from the decreased outlet temperature of the primary reformer. A first advantage is a reduction of natural gas consumed to heat the primary reformer. Another positive effect of the invention is the reduction of the thermal power that must be dissipated by means of steam production. Such a reduction is a consequence of both the lower temperature of the gas coming out from the primary reformer, and use of oxygen instead of air as comburent, which reduces the gas flow rate in the heat recovery equipments downstream of the secondary.

It should also be noted that the supply of the oxygen stream and of the nitrogen stream requires an energy source, typically electrical energy that powers an air separation unit (ASU). Such energy can, however, be available from a different source other than natural gas, that is not subject to limitations and/or is less expensive, for example coal or even a renewable source like hydroelectric, solar, etc. In other words, the invention provides an energy replacement, since on the one hand it requires an energy source for the air separation unit, but on the other hand it makes available to the process a part of methane previously used as fuel. This is an advantage in a scenario where the supply of natural gas is limited.

In cases where said electric energy is available from another source, the method according to the invention proves to be particularly advantageous and synergic with the installation of electric motors to replace steam turbines. In some cases, if an alternative fuel is available for the production of steam, it is also possible to import steam from the outside keeping the existing steam turbines.

It can be understood from the above that the invention is particularly attractive in cases when the amount of natural gas suffers from a sudden limitation for technical or contractual reasons.

Another substantial advantage of the invention is that it does not require costly modifications of the existing machines and components. For example, the invention achieves substantial increases in capacity (over 10%) without expensive modifications of compressors and turbines; since the duty of the primary reformer is less than before, modifications to said primary reformer are not needed to increase its capacity, despite the increase in production.

According to other preferred embodiments, the production of steam of the plant (and consequently the fuel quote of the gas supply) is further reduced with at least one of the following provisions, or with a combination thereof:

installation of a steam superheater at the outlet of the secondary reformer, installation of a reformer of the GHR (Gas Heated Reformer) type downstream of the secondary reformer, installation of a preheater of the combustion air for the primary reformer.

The advantages of the invention will now be illustrated with reference to example embodiments and with the help of the figures.

DETAILED DESCRIPTION OF PREFERRED EMBODIMENTS OF THE INVENTION

Figure 1:
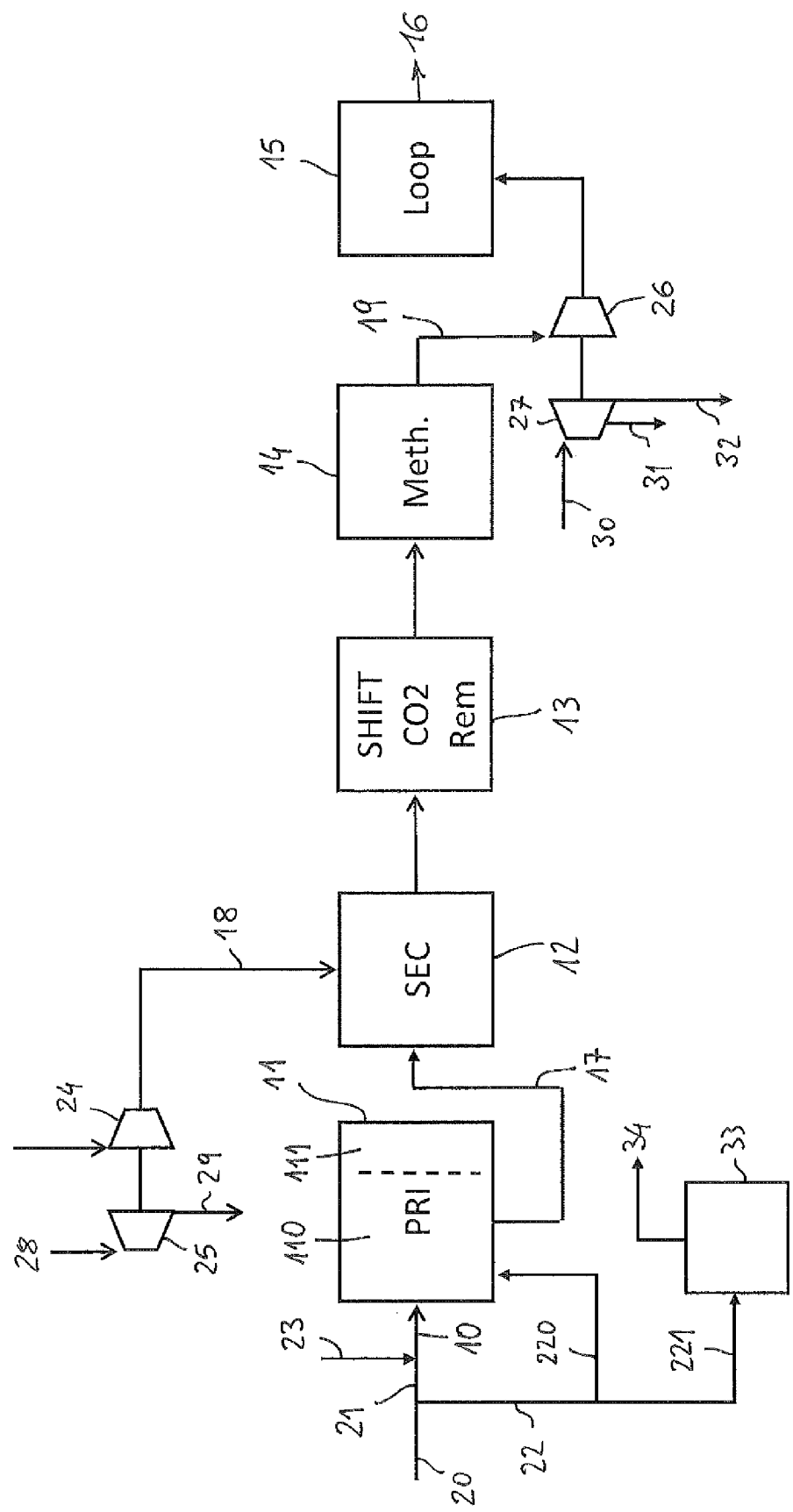
FIG. 1 is a block diagram of an ammonia plant fed with natural gas, according to the prior art.

The diagram of FIG. 1 shows the essential components of an ammonia plant, namely a primary reformer 11, a secondary reformer 12, a section 13 for converting the carbon monoxide (shift) and removing $CO_2$; a methanation section 14. Block 15 indicates the ammonia synthesis loop. Said block 15 converts a flow of synthesis gas or make-up gas 19 obtaining ammonia 16.

There are also, typically, a series of heat exchangers not shown in the figures. In particular there is an exchanger known as waste heat boiler downstream of the secondary reformer 12.

A stream 10 containing natural gas and steam feeds the primary reformer 11. The partially reformed gas 17 flowing out from the primary reformer 11, at a temperature of about 800° C., is fed to the secondary reformer 12 together with comburent air 18 delivered by a compressor 24.

The effluent of the secondary reformer, after treatment in block 13 (shift and CO2 removal) and block 14 (methanation) generates the make-up gas 19 that feeds the loop 15. It should be noted that the required nitrogen enters substantially with the air stream 18. The gas 19 is normally produced at a pressure below that of the loop 15 and therefore a gas compressor 26 raises the pressure to the synthesis level.

The compressor 24 and the compressor 26 are powered by steam turbines respectively indicated with reference numerals 25 and 27. The turbine 25 is fed with steam 28 usually at a medium pressure (for example about 40-50 bar), and discharges steam 29 at a low pressure. The turbine 27 is fed with steam 30 generally at a high pressure (typically over 100 bar) and discharges low pressure steam 32; moreover, there is usually a steam bleed 31 at medium pressure. Said steam bleed 31 can provide steam for the flow 28 or other medium pressure steam consumers in the plant. Such aspects are not essential, however, for the description of the invention.

The natural gas contained in the stream 10 is part of a supply 20 that represents the overall amount of natural gas available to the plant. The supply 20 is split into a process quote also known as "feed" denoted with 21, and a fuel quote denoted with 22.

The process quote 21, after addition of steam 23, forms the stream 10 of process gas entering the primary reformer 11. The remaining fuel quote 22 represents the fuel used substantially to heat the reformer 11 and to produce mechanical power for the air compressor 24, the gas compressor 26, and other auxiliaries.

In the example of FIG. 1, a first portion 220 of said fuel quote 22 heats the primary reformer 11; a second portion 221 feeds a boiler 33 (which is conventional in itself) to produce steam 34.

More specifically, the primary reformer essentially comprises a radiant section 110 and a convective section 111.

The radiant section 110 contains tubes filled with catalyst and carries out the endothermal conversion into hydrogen of the methane and steam contained in the feed 10. Said radiant section 110 is heated through a series of burners fed by the natural gas flow 220.

The convective section 111 substantially recovers heat from the fumes generated by said burners, and coming from the radiant section 110. In general, due to the high temperature of the fumes, the convective section 111 is used mainly to superheat the steam. If necessary, the convective section can also comprise burners fed with a part of the stream of gas 220 (not illustrated).

The figure shows a boiler separate from the reformer that typically produces steam 34 at medium pressure. It should be noted that this setup is purely illustrative and numerous variants are possible. For example, the boiler 33 in some cases is integrated in the convective part 111 of the reformer.

For the purposes of the present invention, it should be noted in particular that the turbines 25 and 27, necessary to drive the compressors 24 and 26, represent two substantial contributors to steam consumption, absorbing the flows 28 and 30. Another significant steam user (not shown) is represented by the compressor of the ammonia (and relative turbine) of the refrigeration section inside the loop 15. The production of steam derives substantially from the fuel quote 22 of the gas supply 20.

Figure 2:
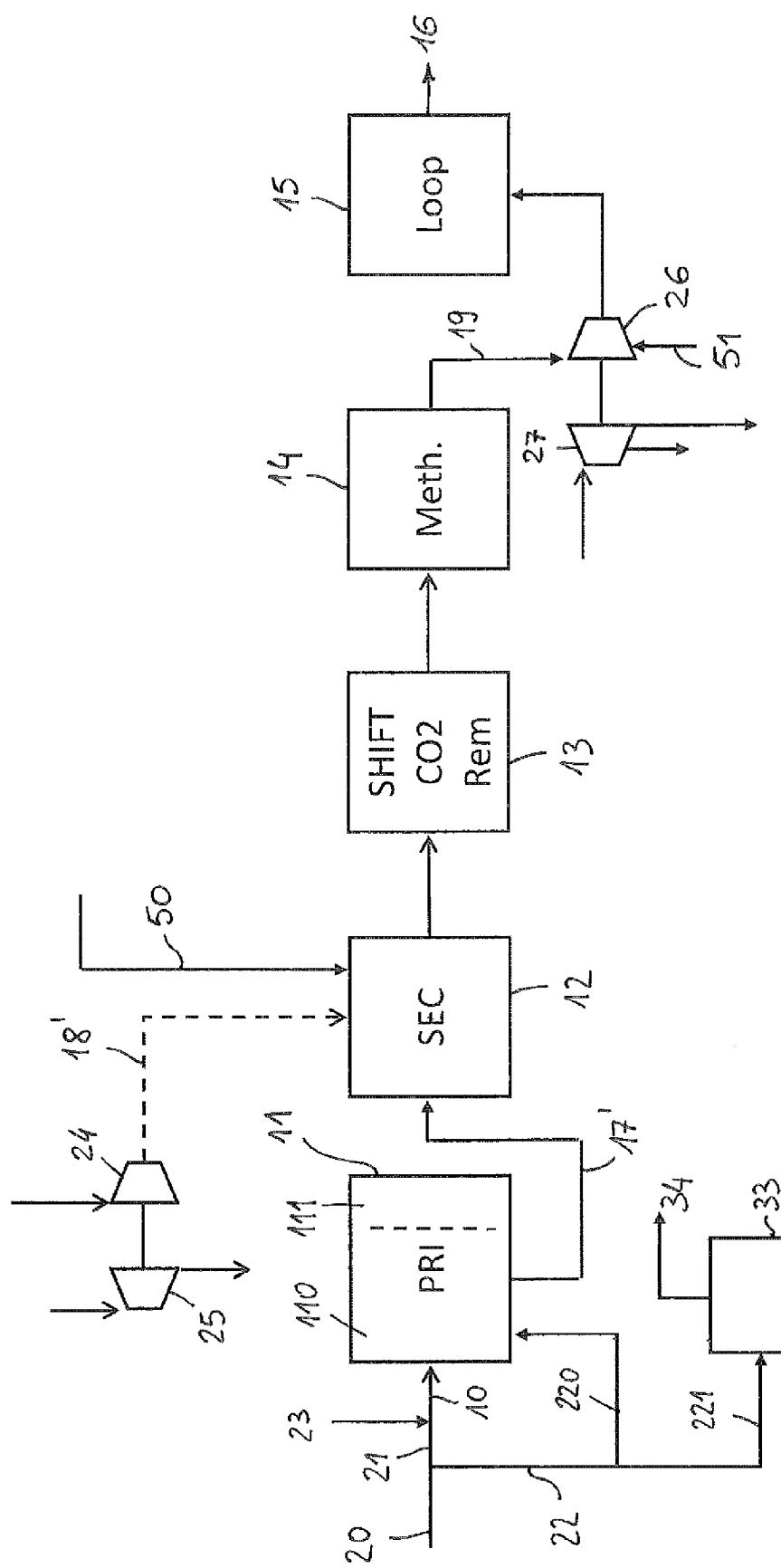
FIG. 2 is a block diagram of the plant of FIG. 1 revamped according to one of the embodiments of the invention.

FIG. 2 represents the plant of FIG. 1 revamped according to the invention. The comburent for the secondary reformer 12 is now supplied, at least in part, by a stream 50 of substantially pure oxygen, produced for example in an air separation unit (ASU). The flow rate of air 18' is therefore reduced in comparison to the flow rate 18 of FIG. 1. The line 18' is indicated with a broken line since in some embodiments all of the oxygen for combustion in the secondary reformer is supplied by the stream of oxygen 50 and therefore the stream of air 18 is eliminated.

The stream 50 can be produced for example in an air separation unit, which requires electrical energy but does not require steam and does not require natural gas. Therefore, by reducing or eliminating the consumption of the compressor 24 (i.e. the flow of steam 28), the intervention makes it possible to reduce the fuel quote 22 and leaves a greater quote of the supply 20 for use as process gas 21.

In a suitable point of the plant, a stream of nitrogen 51 is introduced, which can also be obtained by means of air separation. Advantageously, like in the figure, the stream of nitrogen 51 is introduced downstream of the methanation section 14 and at the intake of the compressor 26, as shown.

The revamping of the plant also includes a significant reduction of the heat exchanged in the radiant part 110. Preferably, said heat (duty) is reduced by at least 30% and more preferably by at least 50%. Such a reduction in duty of the radiant part 110 can be obtained by reducing the portion 220 of natural gas directed to the burners of the radiant part. Consequently, the stream of partially reformed gas coming out from the primary reformer 11, now indicated with 17', has a lower temperature, advantageously comprised between 650 and 750° C.

It should be noted that by the effect of this intervention, the amount of methane converted into hydrogen in the reformer 11 is reduced, i.e. the duty of the conversion into hydrogen is shifted substantially to the secondary reformer 12. The consequence is a slight increase in the specific consumption of process gas, which however is overcompensated by the decrease of the consumption of fuel. This advantage will become more evident hereafter, with the help of an example.

The production of steam 34 and the fuel quote 221 can also be reduced thanks to the invention.

Other options that make it possible to reduce the production of steam of the plant and consequently the fuel quote of the supply of gas are as follows.

A first option is the installation of a steam superheater at the outlet of the secondary reformer, downstream of the waste heat boiler (whose process side exit temperature is increased). Such a provision makes it possible to reduce the generation of steam in the waste heat boiler, producing a smaller amount of steam but at a higher temperature, to therefore reduce the superheating in the convective part 111 of the primary reformer and to reduce the fuel. Said provision is particularly effective when a part of the fuel gas 220 is burnt in said convective section.

A second option is the installation of a preheater of the combustion air of the primary reformer, which makes it possible to reduce the fuel consumption of the reformer itself for the same heat transferred in the radiant zone, and the amount of fumes in the convective part.

A third option is the installation of a reformer of the GHR (Gas Heated Reformer) type downstream of the secondary reformer. Said GHR is substantially a gas-gas heat exchanger, for example with tubes. Said GHR allows that part of the heat of the effluent of the secondary reformer is used for a further reforming step instead of being used to produce steam.

EXAMPLES

Example 1

The following table 1 refers to a first example of application of the invention.

A conventional plant according to FIG. 1 is fed exclusively with natural gas and has a total consumption of 8.0 Gcal/t of ammonia, based on the LHV of natural gas. Such consumption is divided as follows:
process feed gas (21): 5.4 Gcal/t (67.5%);
fuel gas (22): 2.6 Gcal/t (32.5%).

The consumption of fuel gas comprises the fuel of the reformer (radiant and convective) and fuel of an auxiliary burner to produce the steam necessary to operation. For a production of 1500 MTD of ammonia, the total consumption of natural gas (flow 20) comes to 2629 kmol/h.

In an embodiment indicated as "A", the plant is revamped with the following basic interventions:
injection of oxygen (flow 50) into the secondary reformer 12 in place of air,
injection of a nitrogen flow 51;
reduction of the duty of the primary reformer 11 and consequent lowering of the outlet temperature of said primary reformer.

The air compressor is no longer used and the relative steam consumption is eliminated. The fuel consumption reduces, both by the lower exit temperature of the catalytic tubes, and reduction of the total steam consumption. The modification "A", according to the invention, substantially does not require modification of the machines (compressors and turbines).

As can be seen from the table, the specific consumption of natural gas [Gcal per ton of ammonia] of the feed quote is slightly penalised passing from about 5.4 to 6 Gcal/t. This is due to the fact that the conversion of methane into hydrogen decreases in the primary reformer 11 and moves to the secondary 12, where the reaction is less favourable. The decrease in duty of the primary reformer 11 is shown in the table by the duty of the reformer passing from 74.3 to 38.2 Gcal/h. The specific duty, in relation to the tons of ammonia produced, consequently decreases from 1.19 to 0.55 Gcal/h per ton. The outlet temperature (flow 17) falls from 800 to 650° C.

The slight penalisation in specific consumption, however, is compensated by a drastic decrease of the fuel quote 22, which passes from 2.59 to 1.18 Gcal/t. In other words, a slight loss of conversion efficiency is overcompensated by a greater availability of gas for the feed quote 21, for the same overall supply 20. It can thus been seen that for the same total consumption (2629 kmol/h), the production of ammonia increases from 1500 to 1666 MTD (+11%). It should also be noted that the flow rate of high pressure steam substantially decreases both in absolute terms and in specific terms.

The table shows the results obtained with the aforementioned variant "A" of the invention, compared with a modification according to the prior art, indicated as "C". Said modification "C" represents the conventional approach that tends to increase the efficiency of the machines, and essentially provides:
increased efficiency of 5% of the three main machines: syngas compressor, air compressor and ammonia compressor, and of the respective turbines,
decreased pressure of the synthesis loop by 10 bar with addition of a booster reactor.

It should be noted that the modification "C" according to the prior art does not decrease but actually increases the duty of the primary reformer by about 4% passing from 74.3 to 77.4 Gcal/h. Moreover, it requires an expensive modification intervention on compressors and turbines (replacement of internal components, etc.). Despite this, the capacity is increased only by 4%.

TABLE 1

| CASE | | BASE | A | C (PRIOR ART) |
|---|---|---|---|---|
| Ammonia Production | MTD | 1500 | 1666 | 1564 |
| Variation | | | 111% | 104% |
| Specific consumption (FEED + FUEL), LHV | Gcal/t | 8.01 | 7.21 | 7.68 |
| Specific consumption FEED | Gcal/t | 5.41 | 6.03 | 5.41 |
| Specific consumption FUEL | Gcal/t | 2.59 | 1.18 | 2.27 |

TABLE 1-continued

| CASE | | BASE | A | C (PRIOR ART) |
|---|---|---|---|---|
| Total consumption of natural gas | kmol/h | 2629 | 2629 | 2629 |
| Flow rate of process air | t/h | 70.0 | 0 | 73.0 |
| Duty of Primary reformer (radiant) | Gcal/h | 74.3 | 38.2 | 77.4 |
| Primary outlet temp. | °C. | 800 | 650 | 800 |
| Secondary outlet temp. | °C. | 950 | 950 | 950 |
| Synthesis pressure | bar abs | 164 | 173 | 154 |
| Flow rate of Oxygen | t/h | — | 34 | — |
| Flow rate of Nitrogen | t/h | — | 57 | — |
| Flow rate of high pressure steam | t/h | 322 | 277 | 311 |
| Specific flow rate of high-pressure steam | $T_{steam}/t_{NH3}$ | 5.2 | 4.0 | 4.8 |

Example 2

A plant is modified according to the previous Example 1. In addition, all the machines of the ammonia plant with the exception of the syngas compressor, originally powered by steam turbines, are modified to use electric motors. The consumption of fuel gas is therefore further reduced. This variant is shown in table 2 as variant "B".

It is compared with a modification indicated as "D" that is equivalent to the modification "C" described above and also comprises:
- electric motors as drivers for the machines normally powered by steam turbines
- increase by 12% of the capacity of the steam reformer 11 and 7% increase of radiant efficiency by introducing an air preheater.

TABLE 2

| | | BASE | B | D (PRIOR ART) |
|---|---|---|---|---|
| Ammonia Production | t/d | 1500 | 1795 | 1680 |
| Variation | | | 120% | 112% |
| Specific consumption (FEED + FUEL), LHV | Gcal/t | 8.01 | 6.69 | 7.15 |
| Consumption FEED | Gcal/t | 5.41 | 6.03 | 5.41 |
| Consumption FUEL | Gcal/t | 2.59 | 0.66 | 1.74 |
| Total consumption of gas | kmol/h | 2629 | 2629 | 2629 |
| Flow rate of process air | t/h | 70.0 | 0 | 78.4 |
| Primary reformer Duty (radiant) | Gcal/h | 74.3 | 41.1 | 83.2 |
| Primary outlet temp. | °C. | 800 | 650 | 800 |
| Secondary outlet temp. | °C. | 950 | 950 | 950 |
| Synthesis pressure | Bar abs | 164 | 173 | 154 |
| Flow rate of Oxygen | t/h | — | 37 | — |
| Flow rate of Nitrogen | t/h | — | 61 | — |
| Flow rate of high pressure steam | t/h | 322 | 261 | 280 |
| Specific flow rate of high-pressure steam | $t_{steam}/t_{NH3}$ | 5.2 | 3.5 | 4.0 |

The variant "B" according to the invention produces 20% more ammonia than the base case, whereas the variant "D" (prior art) only produces 12% more.

In both cases it has been assumed that there is a constant total consumption of gas (2629 kmol/h), i.e. assuming that said amount (stream 20 of FIG. 1) is the maximum available and cannot be increased. The examples make clear that invention allows a substantial increase of the production, by 11% and 20% respectively, for the same gas supply.

The invention claimed is:

1. A method for revamping and increasing the capacity of an ammonia plant fed with natural gas, wherein:
said plant comprises a front-end section for converting natural gas into a make-up gas for ammonia synthesis, and said front-end section comprises a primary reformer and a secondary reformer,
the overall supply of natural gas fed to the plant comprises a process quota which is used for the catalytic conversion of methane into hydrogen and is fed to said primary reformer, and a fuel quota,
said primary reformer comprises a radiant section and a convective section, said radiant section performs a catalytic conversion of said process gas and transfers to said process gas a thermal power also called duty of the reformer,
said secondary reformer is fed with comburent process air and with partially reformed process gas coming from the primary reformer,
the method comprises at least the following interventions:
decreasing said duty of the primary reformer relative to the amount of ammonia produced, and consequently decreasing the exit temperature of the partially reformed gas effluent from said primary reformer;
adding a feeding line for feeding substantially pure oxygen directed to said secondary reformer, to at least partially replace said comburent process air;
adding an injection line for injecting nitrogen in a quantity necessary to obtain said make-up gas suitable for ammonia synthesis; and
reducing said fuel quota and consequently increasing said process quota, for a given supply of natural gas.

2. The method according to claim 1, wherein the temperature of the process gas flowing out from the primary reformer is reduced by at least 30° C.

3. The method according to claim 2, said temperature of the process gas flowing out from the primary reformer, after revamping, being comprised between 600 and 750° C.

4. The method according to claim 1, wherein said feeding line of pure oxygen completely replaces said comburent air, and the previously existing process air flow directed to the secondary reformer is eliminated.

5. The method according to claim 1, wherein said nitrogen injection line is provided to add nitrogen downstream of an existing methanation section.

6. The method according to claim 1, wherein one or more steam turbines for operation of the plant are replaced by electric motors.

7. The method according to claim 1, wherein the steam production of the plant is reduced with at least one of the following provisions:
i) installation of a steam superheater at the outlet of the existing secondary reformer,
ii) installation of a reformer of the GHR (Gas Heated Reformer) type downstream of the existing secondary reformer,
iii) installation of a preheater of the combustion air fed to the radiant part of said primary reformer.

8. The method according to claim 2, wherein the temperature of the process gas flowing out from the primary reformer is reduced by at least 50° C.

9. The method according to claim 3, wherein said temperature of the process gas flowing out from the primary reformer, after revamping, is between 650 and 750° C.

* * * * *